June 2, 1936.  H. C. FOSTER  2,043,162
MACHINE EVENT TIMER
Filed June 16, 1933　　2 Sheets-Sheet 1
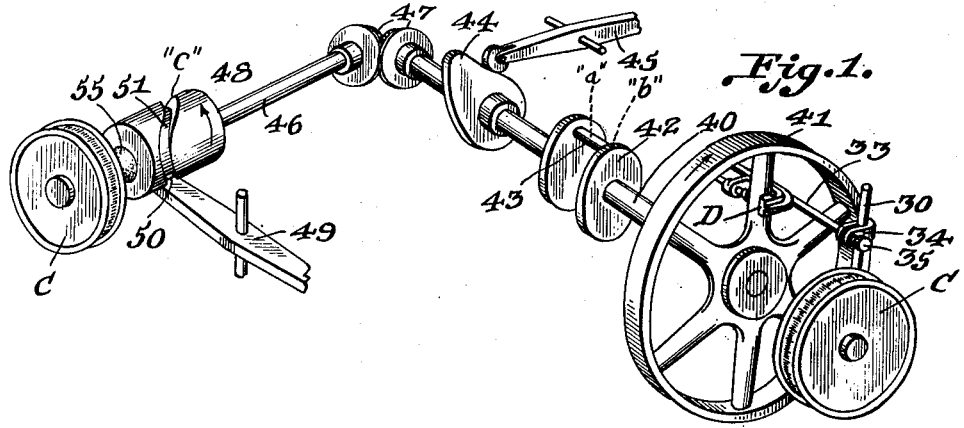
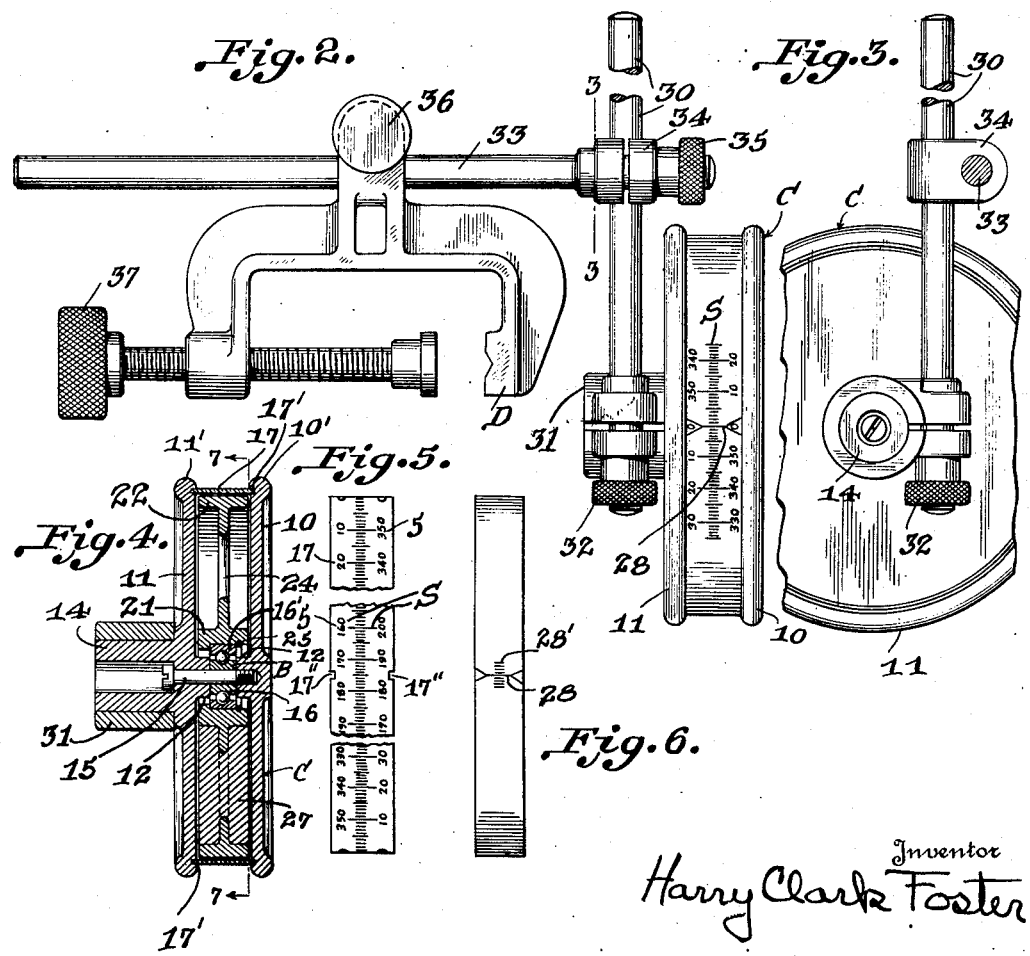

June 2, 1936.  H. C. FOSTER  2,043,162

MACHINE EVENT TIMER

Filed June 16, 1933  2 Sheets-Sheet 2

Inventor
Harry Clark Foster
By  Attorney

Patented June 2, 1936

2,043,162

UNITED STATES PATENT OFFICE 2,043,162

MACHINE EVENT TIMER

Harry Clark Foster, Alton, Ill.

Application June 16, 1933, Serial No. 676,177

8 Claims. (Cl. 33—181)

This invention relates to certain improvements in machine event timers; and the nature and objects of the invention will be readily recognized and understood by those skilled in the arts involved in the light of the following explanation and detailed description of the accompanying drawings, illustrating what I at present consider to be the preferred embodiment or mechanical expression of my invention from among various other forms, arrangements, embodiments, combinations and constructions of which the invention is capable within the spirit and the scope thereof.

When an automatic machine or mechanism is designed, it is quite frequently necessary to prepare a timing diagram of the relative movements of the various coordinating parts and elements of the machine that are to occur during one machine cycle, so as to provide a guide that can be followed in setting up and assembling the machine in order to obtain the desired and proper timing and coordination of such various parts and elements, in the operation of the machine. In building and assembling such a machine or mechanism, it is necessary for the machinist or other person carrying out the assembly work to adjust the various cooperating and coordinating elements such, for example, as cams, cranks, sprockets and other mechanisms and elements, to accord with such a timing diagram. These adjustments of the parts and elements of the machine or mechanism are difficult to make accurately and the making thereof is time consuming with considerable possibility for error, so that in practice, even with a timing diagram to follow, there is a tendency toward trial and error methods if what is thought to be the proper adjustments have been made.

It is therefore, a main object and purpose of my present invention to provide a device or instrumentality that can be efficiently utilized in the timing and coordinating of the elements and parts of an automatic machine or other mechanism in relation with each other and with other parts, so as to enable the rapid and accurate adjustment of such parts and elements into the required timed and coordinated relation with each other for the proper functioning thereof in the operation of the machine or mechanism.

A further object of the invention is to provide such a device or instrumentality in the form of an attachable timer or indicator of relatively simple and inexpensive design and construction that can be readily mounted and attached in operative position on a part or element of a machine or mechanism from which it is desired to time and coordinate the positions of other parts or elements of the machine with respect to the movement of the element to which the timer is attached; and further, to so design and construct the timer that it will visually indicate accurately the degree of movement of the part or element to which attached, and which will enable the reading thereof under normal working conditions with a minimum possibility of reading errors.

A timer of my invention is characterized by a casing or housing that carries a peripheral or annular scale or scales therearound concentric with the axis of the casing, with a mounting for attaching the casing onto the desired machine part or element for movement of the casing with such part or element, together with a gravity controlled, freely movable member carrying a reference mark visible through the casing in its position relative to the scale markings and maintained by gravity in relatively fixed position as the casing with its scales, are moved relatively thereto; and a further object of my invention is to so design and construct the casing and the scales carried thereby, that the reference mark or marks on the gravity controlled member within the casing are at all times in extremely close proximity to the scale, in order to thereby reduce and practically eliminate appreciable errors in reading the scale or scales from the reference mark, which errors might arise due to the angle of the line of sight of the reader.

A further object of the invention is to provide a mounting for the timer or indicator of a universal character by which it can be readily mounted and attached to, or detached from, the desired machine part or element; and further, by which the casing of the timer is adjustable through 360° around an axis on the mounting co-incident or parallel with the axis of the gravity controlled reference mark carrying member, to thereby permit of setting the casing scales in the desired starting relation with the reference mark on the gravity controlled member, preparatory to the use of the timer or indicator in timing and adjusting the various parts or elements in relation to the movement of the timer or indicator carrying part or element of the machine.

A further feature and characteristic of the invention resides in the design, construction and mounting of the gravity controlled reference mark carrying member in the form of a wheel or disk within the casing or an anti-friction or minimum resistance bearing, so that errors due to lag or friction from the mounting of the gravity controlled member, in the movement of the casing there around, in using the timer or indicator, are reduced to an immaterial point in the practice and operation and use of the timer.

A further object of the invention is to provide such a timer or indicator that will materially facilitate the timing of a machine or mechanism and one that is particularly useful and efficient in both the setting up and assembling of a machine from a prepared timing diagram, as well as in checking, correcting and adjusting the timing of the parts and elements of an already set up and existing machine from a timing diagram for that machine.

With the foregoing general objects, characteristics and results in view, as well as certain others that will be readily recognized and appreciated from the following explanation, my invention consists in certain novel features in construction and in combination, and relative arrangements of parts and elements, all as will be more fully referred to and specified hereinafter.

Referring to the accompanying drawings in which similar reference characters refer to corresponding parts and elements through the several figures:

Fig. 1 is a more or less diagrammatic view in perspective of portions of a machine or mechanism showing the timers or indicators of my invention mounted and attached to parts thereof for functioning in the timing and coordinating of other parts or elements of the mechanism with respect to the movements of those parts or elements to which the timers are attached.

Fig. 2 is a plan view of an indicator embodying my invention and of a mounting therefor by which the timer can be attached or mounted on a part or element of a machine or mechanism.

Fig. 3 is a vertical transverse section taken on the line 3—3 of Fig. 2, through the timer mounting.

Fig. 4 is a vertical transverse section through the indicator and a portion of its mounting.

Fig. 5 is a plan view of the scale carrying, transparent peripheral wall of the casing, showing the scales on the under side thereof and visible therethrough.

Fig. 6 is a plan view of the gravity controlled reference mark carrying wheel or disk that is mounted within the casing and showing one of the reference marks thereon.

Figure 7:
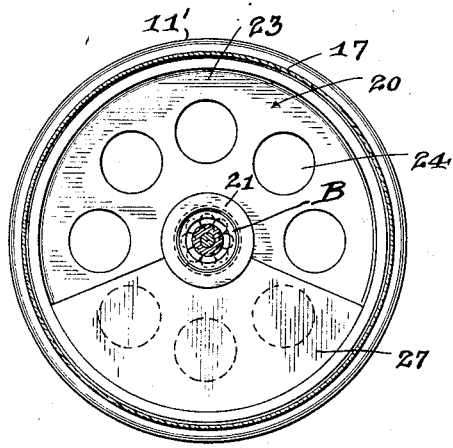
Fig. 7 is a longitudinal section through the timer or indicator of Figs. 2 and 4, taken on the line 7—7 of Fig. 4 and showing the gravity controlled reference mark carrying wheel or disk in side elevation.

I have illustrated by way of example in Figs. 2 to 7, inclusive, of the accompanying drawings, a form and embodiment of a machine event timer or indicator that I now happen to believe is the preferred form and embodiment of my invention. However, there is no desire or intent to limit the timer or indicator in all respects and in its broad aspects, to the exact and specific form shown in such figures, or to the specific mounting therefor, as herein disclosed.

In this preferred form, the indicator includes a circular casing or housing C that embodies the spaced circular side plates or members 10 and 11, having the rounded or beaded peripheral edges 10' and 11' and the inwardly projected facing and axially alined hub portions 12. The casing side plate or member 11, that may be aptly termed the inner side plate of the casing is provided with the outwardly extended, exterior hub portion or sleeve 14, having an axial bore therethrough alined with a reduced diameter bore extending through the hub portion 12 of such plate 11.

A headed machine screw, bolt or the like element 15, is extended through the reduced diameter bore of plate 11, and extends across and between plates 10 and 11 to the hub portion 12 of plate 10 into which it is axially threaded and secured. In mounted position, the head of the machine scew or the like 15, is seated and bears against the inner end wall of the bore of the exterior, extended hub portion 14, as will be clear by reference to Fig. 4 of the drawings in particular. The casing side plate members 10 and 11 are maintained in the desired spaced and parallel relation by the inwardly extended and alined hub portions 12 that are connected and joined by the machine screw or the like 15, and by the inner ball race or cage 16 of an anti-friction bearing B, that is mounted on machine screw 15 between the hub portions 12 with the hub portions tightly and firmly secured there against by the aforesaid machine screw.

A scale bearing circumferential or peripheral edge wall 17 of transparent material such, for example, as celluloid, is secured across and between and joins the peripheral edge portions 10' and 11' of the casing side plates to thereby complete and form the hollow, circular casing or housing C, of the timer or indicator. In the example hereof, the circular peripheral edge wall 17 is at its opposite edges, engaged and seated in the circular grooves 17' formed around the inner sides of the opposite edge beads 10' and 11' of the side plates, respectively. This wall 17 can be formed in any suitable manner of the desired transparent material, as either an endless band or ring, or as a strip or band of the desired material bent into ring or annular form and inserted and held between the side plates 10 and 11 in the opposite and facing grooves 17'. In order to prevent relative movement between the scale carrying peripheral edge wall 17 of the casing, and the casing side plates or members 10 and 11, suitable notches 17" can be cut into the opposite edges of the wall (see Fig. 5) for the purpose of engaging and receiving suitable tongues or projections (not shown) formed in the opposite grooves 17', respectively.

In carrying out my invention in the form thereof now described, the casing peripheral wall 17 is transparent and has the proper scales S formed therearound on the inner surface thereof, for the purpose and to obtain a result that will be referred to more in detail hereinafter. The scales S, of the present example are divided into 360° of a complete circle and are suitably numbered consecutively, each in the direction reverse to the numbering of the other, as will be clear particularly by reference to Figs. 2 and 5 of the drawings, so that there is a scale available for either direction in which the casing may be rotated. Thus, the casing C provides the scales S therearound, concentric with the axis of the casing as defined by the hub portions 12 and the machine screw or other suitable element 15, these scales being formed and applied on the inner surface of the transparent wall 17 and visible and readable therethrough from the exterior of the casing. A member 20 in the form of a wheel or disk, having a hub 21 with an axial bore therethrough and a rim 22 connected to and joined with the hub 21 by a web 23 having the holes or openings 24 therethrough spaced at intervals therearound, is freely rotatably mounted within the casing C, on the bearing B, so that this member 20 is mounted within and concentric with the casing for rotation on and around the casing axis as hereinbefore defined.

In the mounting of the member 20, its hub member 21 fits over, receives and is secured to the outer ball race or cage 16' of the bearing B, a split spring ring or the like 25 being provided to maintain race 16' against a suitable shoulder provided therefor within the bore of hub 21. Thus, the wheel or disk member 20 is mounted within the casing C, for rotation on and around the bearing B, independently and freely of the casing C, as clearly shown by Fig. 4 of the drawings.

This freely rotatably mounted wheel or disk member 20 is, in accordance with my invention, gravity controlled, so that it will maintain and hold its normal position against rotation, upon rotation or movement of the casing C, relative thereto; and in the example hereof, this gravity control is imposed upon the member 20 by providing it with a weighted portion 27 that may take the form of a suitable metal poured and molded onto both sides of the web 23 and keyed thereto by portions of the metal extending through certain of the hub openings 24. This possible formation of the weighted portion 27 on the wheel 20 will be clearly apparent by reference to Figs. 4 and 7 of the drawings. In this way, the weight 27 provides for maintaining the member 20 in a substantially definitely determined position by the action of gravity on the weight, and thus permits of freely rotating or moving the casing C independently of member 20, which member will remain in or come to its normal relatively fixed position after rotation or movement of the casing has been completed. This weighted wheel or member 20 is provided with and carries a suitable reference mark 28 on the outer surface of its rim or periphery 22, which mark performs the function of a hairline or indicator line with reference to the scales S, of the casing. In Figs. 2 and 6 of the drawings, such a reference mark 28 is shown as embodying a line transverse of the rim of member 20 and provided at its opposite ends, adjacent the opposite edges, respectively, of the rim, with divider or pointer forming legs. Preferably, there are similar reference marks provided at 90° spacing around the rim of member 20, in order to facilitate reading of the scales from over head or from right or left side positions, as will be readily understood in view of the hereinafter appearing explanations.

In order to obtain increased accuracy of reading, each reference mark 28 may be, if desired, provided with vernier lines 28' extending from each side thereof, such vernier marks having, for example, a spacing representative of minutes of a degree.

The invention provides a mounting for the casing C, with its gravity controlled reference mark carrying wheel or member 20, and in the form of Figs. 2 to 7, this mounting includes a clamp D that is carried from the hub portion 14 of the casing by a series of adjustable rod members. For instance, such mounting may include a rod 30, having at one end a clamp 31 fixed against rotation on said rod, that is fitted over and concentric with the hub portion 14, and that has a threaded nut member 32 by which the rod and clamp can be attached in a suitable fixed position on and holding the casing against rotation within clamp 31. A rod 33 that carries a clamp 34 is adjustably mounted by clamp 34 onto the rod 30 with the rod 33 disposed transversely or at substantially right angles to the hub carried rod 30. Rod 33 can thus be adjusted longitudinally of the rod 30 and fixed in any desired position there along by the clamp operating nut 35. The clamp D in the example hereof is of the so-called C-type and carries a clamp 36 intermediate its base which is adjustably fitted onto the rod 33 so that the clamp is capable of adjustment longitudinally of the rod and through the medium of the clamp can be fixed to any desired adjusted position thereon. The clamp D also includes the clamping screw 37, by which the clamp D is attached and fixed to a desired part or member of a machine or other mechanism.

In the operation and use of the timer or indicator, with its mounting in the form hereinbefore described, to time a machine or mechanism, the timer is attached by its mounting in position on an element of the machine or mechanism from the movement of which the relative positions of other elements of the machine are to be timed and related. As an example, I have illustrated in Fig. 1, of the drawings, more or less diagrammatically, a portion of a machine or mechanism that embodies a main shaft 40 having a driving pulley or fly-wheel 41 on one end thereof and including on the shaft a crank 42 having crank pin 43. On the shaft 40 there is also a face cam 44 that operates a follower 45. A second shaft 46 is driven from shaft 40 through the engaging bevel gears 47, and on this shaft 46 is a drum cam 48 that operates a follower 49 having a roller 50 that engages a cam groove 51 in the drum cam 48. Now, the shaft 40 can be considered as the main shaft of the machine, and one revolution of this shaft as one cycle or operation of the machine or mechanism. In either assembling this mechanism or in checking the timing thereof, the cam 44 will have a certain time during the revolution of the shaft 40 at which its high point is required to engage and act upon its follower 45. It may be further considered that one revolution of the shaft 40 constitutes the complete cycle which is begun and completed with the crank pin 43 at the position indicated as "a" in Fig. 1. Assume that the design and timing of this mechanism requires the cam face to raise the follower 45 to its maximum height when the crank pin has been rotated through 30 degrees by the shaft 40, from the position "a" to the position "b".

The timer or indicator of my invention is utilized to measure and accurately indicate the rotation of the shaft 40 from its starting point of a cycle through the required number of degrees at which cam 44 is to move its follower 45 to the maximum height. The shaft 40 and the fly-wheel 41 are rotated, say, by hand, to place the crank pin 43 in its starting position "a", that is, the starting position for the complete cycle, and then the timer of the invention is mounted by the clamp D to a spoke of fly-wheel 41 with the rods 33 and 30 so adjusted as to place the casing C in a vertically disposed position with its axis substantially parallel and preferably alined with the axis of the shaft 40, although it should be here clearly understood that this alinement is not essential and that the timer can be operated to give the desired accurate readings without having its axis in alinement with the axis of the member to which it is attached and with which it is revolved. The gravity controlled reference mark carrying member or wheel 20 within casing C will maintain its position with its reference marks visible through the transparent scale carrying wall 17. Now, after mounting the timer and after setting the shaft to place the crank 42 in position at the start of the cycle, the clamp 31 is loosened to permit manual turning or rotation of casing C until the zero marks of the two scales S, are in alinement and registering with the uppermost or top reference mark 28 of the gravity controlled wheel or member 20. Clamp 31 is then tightened and the fly-wheel 41 with shaft 40 is turned or rotated by hand until the 30° line on that scale S, which is numbered consecutively in the direction of shaft rotation, is alined or is in registry with the upper reference member 28. The cam 44 is then rotated on and independently of shaft 40 until its highest point is positioned under and in engagement with the follower 45. When adjusted to this position, the cam 44 is then fixed to the shaft 40 and has thus been set and adjusted into proper timing and coordination with the crank 42 and the degree of rotation of the shaft 40.

Now, assume that another 150° rotation, that is a total of 180° crank pin 43 movement is required to position the point "c" of the drum cam groove 51 adjacent the follower roller 50, then the fly-wheel 41 would be further revolved by hand until the 180° mark on the proper scale S, registered with the reference mark 28. Upon reaching the 180° mark in registry with the reference mark, the cam 48 would then be adjusted on its shaft 46 to engage point "c" with the cam follower roller 50, and there fixed in such position on the shaft 46, properly timed and coordinated as required in relation to the degree of rotation of the main shaft and its crank.

Thus, from the foregoing specific example, it is apparent that a timer or indicator of my invention makes it readily possible to accurately time and coordinate the operating parts and elements of a machine or mechanism, from and in their relation to the degree of rotation of a part or element on which they are dependent, such as shaft 40 of the example, with a high degree of accuracy. Obviously, the specific example of mechanism here shown is not presented by way of limitation but purely for purposes of clearly explaining a use and purpose of the invention.

Attention is directed to the fact that by the arrangement and positioning of the scales S on the inner side or face of the edge ring or peripheral wall 17 of the casing C, such scales are placed very close to the reference mark carrying surface or outer face of the rim of the gravity controlled wheel or member 20. This results in appreciably increased accuracy of reading by substantially reducing errors that might arise in alining or registering the reference mark with the scale divisions in taking a reading, where the angle of sight was not directly alined with the reference mark and scale. Accuracy is further materially aided by the mounting of the gravity controlled wheel 20 on the anti-friction bearing B, because of the reduction of friction to a minimum with the increased sensitivity and reduction in lag and the tendency of the member 20 to rotate with the casing. Any slight rotation or oscillation of member 20 resulting from rotation of the casing will be quickly damped out and member 20 will always return to and come to rest in its true normal position with a minimum of error.

Figure 8:
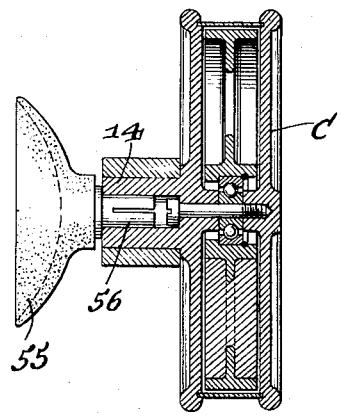
Fig. 8 is a view in side elevation of a suction cup form of mounting for attaching the timer or indicator to the flat face or surface of a part or element of a machine, the exteriorly extended hub portion and the timer or indicator being shown in section with the suction cup in mounted position therein.

The invention further contemplates and includes other forms of mounting or attaching the timer or indicator casing to the desired part or element, and in Figs. 1 and 8 of the drawings, a modified form of mounting is illustrated by which the casing can be removably attached in position on a flat surface. This modified mounting takes the form of a suction cup 55 having an expanded type of stem 56 which is inserted axially and frictionally held in the bore of the extended hub portion 14 of the inner casing plate 11, as clearly illustrated in Fig. 8 of the drawings.

Such a suction cup mounting 55 for the indicator casing C, is shown in attached position in Fig. 1 of the drawings as applied on the flat face of an end wall of the drum cam 48. In this position the timer or indicator functions and operates to give the degree of rotation of the shaft 46 and/or the main shaft 40 where the ratio of gears 47 is known, and from which reading of the rotation of shaft 46, other elements can be timed in the desired coordination. This suction cup 55 form of mounting lends itself to mounting on the flat faces of cams, shafts and such like locations and has the advantage of structural simplicity with ease of attachment and removal.

Figure 9:
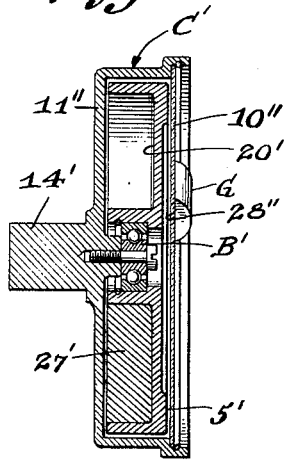
Fig. 9 is a section through a modified form of the timer in which a side wall of the timer casing is transparent and carries the reference mark, while the scale is applied on the adjacent side face of the gravity controlled wheel in cooperative relation and registry with the reference mark.
Figure 10:
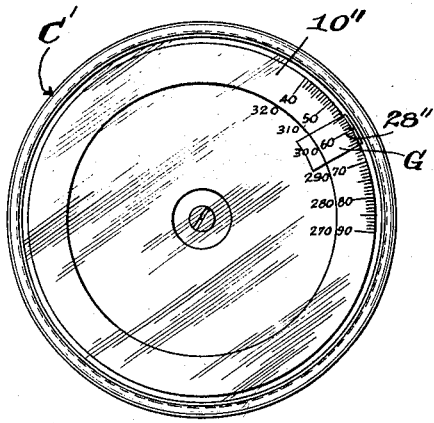
Fig. 10 is a front elevation of the form of the timer of Fig. 9, showing the reference mark and only a portion of the wheel scale in registry therewith.

Within the broad principles of my invention exemplified by what I now consider the preferred form of the invention illustrated in Figs. 2 to 7, and hereinbefore described, a modified form and arrangement of the timer or indicator is illustrated by way of example in Figs. 9 and 10 of the drawings.

In this modified form, the timer or indicator, includes the casing C' of cup-like form having the exteriorly extended hub portion 14' from the inner side wall 11" thereof, with the outer open side of this casing closed by a transparent plate or wall 10" of glass, celluloid, or other suitable transparent material. The gravity controlled wheel or member 20' is mounted as hereinbefore described on the bearing B' within the casing C' and presents an outer side face in proximity to and visible through the transparent side wall 10". On the inner surface of this transparent wall 10" at a proper and desired position, there is applied a reference mark 28" that is preferably covered by a suitable magnifying glass G, affixed on wall 10". A scale or scales are formed and applied around the outer face of the wheel or member 20' completely therearound adjacent the peripheral edge thereof and in line with the reference mark 28", so that this reference mark is in constant registry with the scale around the outer face of the gravity controlled wheel. The use of this form of the invention is similar to that explained hereinbefore and it will be readily understood that as the casing is rotated the reference mark will be moved around the scale which is maintained fixed by gravity relative thereto by the weighted portion 27'; and the degrees of rotation of the casing will be visibly indicated and can be read through the magnifying glass G from the scale S' visible therethrough.

It is to be noted, that if desired, and as an equivalent arrangement, the reference mark 28'' can be carried by the gravity controlled member or wheel 20' while the scales S' can be applied on the inner surface of the transparent end plate or wall 10'' of the timer or indicator.

With a timer or indicator embodying the principle and several features of the invention as hereinbefore exemplified or explained, a machine or mechanism can be readily, accurately timed or synchronized and the parts and elements thereof coordinated, from a suitable timing diagram, either in building or assembling the machine or mechanism, or in checking and adjusting an already assembled, existing machine. While one of the primary purposes of my invention is in the timing of a machine or mechanism, nevertheless it is to be clearly understood that the instrument is capable of a variety of other uses to broadly indicate the degree of rotation or tilting movement of any element or member to which it may be attached and my invention contemplates and includes all of such uses to which the invention may be capable of adaptation.

Attention is further directed to the fact that the term or expression "machine event timer" as used herein and in the appended claims, is intended to cover and include, where not otherwise limited, any of such other uses; the term being used for the sake of uniformity and not in all respects by way of limitation.

It is further evident that various modifications, changes, eliminations, substitutions and additions might be resorted to without departing from the spirit and scope of my invention, and hence, I do not wish to limit myself in all respects to the exact and specific disclosures hereof.

What I claim, is:

1. A machine event timer, including a substantially circular casing for removable attachment to a rotatable element of a machine in position with the casing axis approximately parallel with the axis of the rotatable element, said casing having a transparent peripheral edge wall therearound concentric with the casing axis and provided with a scale thereon and therearound divided into degrees for a complete circle, said transparent scale carrying peripheral edge wall visually unobstructed completely therearound from the exterior of the casing, a gravity controlled and held member within the casing rotatably mounted on an axis coincident with the casing axis, said member being held by gravity against rotation during rotation of the casing and scale thereon by said rotatable element and being provided with a reference mark thereon in position registering with the scale and visible for reading from the exterior of the casing through said transparent scale carrying peripheral edge wall of the casing.

2. A device for visually indicating the degree of rotational movement of an element, embodying a substantially circular casing for attachment to and movement bodily with an element, the movement of which is to be indicated, a mounting carried by the casing for attaching the casing to the element with the casing axis approximately horizontally disposed and substantially parallel to the element axis of rotation, said casing being adjustable around its axis on and independently of said mounting, means for releasably locking the casing in an adjusted position on the mounting, said casing having a transparent peripheral edge wall provided with a scale therearound concentric with the casing axis and divided into degrees for a complete circle, said peripheral edge wall visually unobstructed completely around and from the exterior of the casing, a gravity controlled and held member within the casing rotatably mounted therein on an axis coincident with the casing axis, and said gravity controlled member having a reference mark on its outer edge in proximity to said scale for registry therewith and visible through said transparent scale carrying peripheral wall, said casing being adjustable on said mounting to selectively set the reference mark on the gravity-held member relative to the scale.

3. A device for visually indicating the degree of rotational movement of an element, embodying a substantially circular casing for attachment to and movement bodily with an element the movement of which is to be indicated, said casing having a transparent peripheral edge wall therearound concentric with the casing axis and visually unobstructed completely around the casing from the exterior thereof, a scale formed on the inner surface of said peripheral wall and visible therethrough, said scale divided into degrees completely therearound and consecutively numbered in reverse directions therearound, a gravity controlled wheel member within the casing rotatably mounted therein on an axis coincident with the casing axis, the casing being freely rotatable around and independently of the gravity held wheel member, and said wheel member provided with reference marks at spaced intervals around the outer surface of the rim thereof visible through said peripheral casing wall and in visible registry with said scale, the wheel member being of a diameter to position the reference marks in close proximity to the inner surface scale of the peripheral wall of the casing with but operating clearance therebetween to reduce reading errors.

4. A device for visually indicating the degree of rotational movement of an element, embodying a substantially circular casing including circular side plates having hub portions in axial alinement, a fastening member extending axially through the hub portions of said plates, an anti-friction bearing on said fastening member between said hub portions, a peripheral wall of transparent material secured between and around the outer edge portions of said side plates and visually unobstructed from the exterior of the casing completely therearound, a scale formed on and completely around the inner face of said peripheral wall visible therethrough from the exterior of the casing, said scale divided into degrees for a complete circle and numbered consecutively therearound, a wheel member within the casing rotatably mounted on said anti-friction bearing and provided with a weighted portion for gravity action to mantain the wheel in position against rotaton during independent rotation of the casing therearound, and said wheel having a reference mark across its rim visible through the transparent peripheral wall in registry with the scale on said wall.

5. A device for visually indicating the degree of rotational movement of an element embodying a substantially circular casing for removable attachment in position on an element, said casing including circular side plates having hub portions in axial alinement, a fastening member extending axially through the hub portions and securing the plates together, an anti-friction bearing concentric with said fastening member and disposed within the casing intermediate said side plates, a peripheral wall of transparent material secured between and around the outer edge portions of said side plates and concentric with said anti-friction bearing, said peripheral wall portion being exposed between said side plates completely therearound a scale formed on and completely around said transparent peripheral wall of the casing, a wheel member within the casing freely rotatably mounted on said anti-friction bearing and provided with a weighted portion for gravity action to maintain the wheel member in normal position against rotation during independent rotation of the casing therearound, the wheel member being of a diameter to position the rim thereof in close proximity to and concentric with said peripheral edge wall of the casing and the outer surface of the rim of said wheel member provided with a reference mark thereon in registry with said scale and visible from the exterior of the casing through said transparent peripheral edge wall of the casing.

6. A device for visually indicating the degree of rotational movement of an element embodying a casing, a mounting carried by the casing for removably attaching said casing in position on an element for rotation therewith, the casing being mounted on said mounting for rotation thereon to adjusted positions independently of the mounting, said casing including a transparent peripheral and circular edge wall concentric with the casing axis, a gravity controlled wheel member within the casing freely rotatably mounted therein on an axis coincident with the casing axis, said wheel member being of a diameter to position the outer surface of its rim in close proximity to and around the inner surface of the transparent peripheral edge wall of the casing, and one of said proximate surfaces provided with a scale completely therearound and the other of said surfaces provided with a reference mark in registry with the scale, the registration of scale and reference mark being visible from the exterior of the casing through said transparent peripheral wall.

7. A device for visually indicating the degree of rotational movement of an element, embodying a substantially circular casing for removable attachment to and bodily movement with an element, a mounting carrying the casing for removably attaching the casing to the element with the casing axis approximately horizontally disposed and substantially parallel to the rotational axis of the element, said casing being adjustable around its axis on and independently of said mounting, means releasably holding the casing in an adjusted position on the mounting, a gravity controlled circular wheel member within the casing rotatably mounted on an axis coincident with the casing axis for control by gravity to normally maintain its position against rotation during rotation of the casing by and with the rotatable element, said gravity controlled wheel member providing an annular surface therearound in proximity to and with only operating clearance from the inner surface of the adjacent wall portion of the casing, the portion of the casing wall opposite and facing said annular gravity controlled member surface being transparent and completely visually unobstructed therearound whereby the annular surface of the member is completely visible from the exterior of the casing, one of said facing and proximate surfaces provided with a circular scale in degrees completely there-around concentric with the casing axis and the other of said surfaces provided with a reference mark in registry with said scale, the reference mark and scale being visible through said transparent casing wall portion, and the said casing being adjustable on and independently of said mounting to selectively set points on the scale relative to the reference mark.

8. A device for visually indicating the degree of rotational movement of an element, embodying a substantially circular casing for removable attachment to and bodily movement with an element, a mounting on the casing for removably attaching the casing to the element with the casing axis approximately horizontal and disposed substantially parallel to the rotational axis of the element, said casing being adjustable around its axis on and independently of said mounting, a gravity controlled circular wheel member within the casing rotatably mounted on an axis coincident with the casing axis for control by gravity to normally maintain its position against rotation by rotation of the casing with the rotatable element, said gravity controlled wheel member having an annular surface around one side thereof adjacent the periphery of the wheel member and in proximity to and with but operating clearance from the inner surface of the adjacent side wall of the casing, the portion of the casing wall opposite and facing said annular wheel member surface being transparent and completely visually unobstructed therearound whereby the annular surface of the wheel member is completely visible from the exterior of the casing, the annular surface of the wheel member having a scale in degrees completely there-around concentric with the wheel axis and visible through the transparent wall portion of the casing, the transparent wall portion of the casing having a reference mark on the inner surface thereof in registry with said wheel member scale and visible from the exterior of the casing through the transparent wall portion, and the casing being adjustable on and independently of said mounting when the mounting is attached on an element to selectively set the reference mark relative to points on the wheel member scale.

HARRY CLARK FOSTER.